United States Patent [19]

Mori

[11] Patent Number: 5,005,931
[45] Date of Patent: Apr. 9, 1991

[54] LIGHT RADIATOR

[76] Inventor: Kei Mori, 3-16-3-501, Kaminoge, Setagaya-ku, Tokyo, Japan

[21] Appl. No.: 474,178

[22] Filed: Feb. 2, 1990

[30] Foreign Application Priority Data

Mar. 13, 1989 [JP] Japan .................................. 1-61904

[51] Int. Cl.$^5$ .............................................. G02B 6/00
[52] U.S. Cl. .................................. 350/96.10; 350/96.15
[58] Field of Search ........................... 350/96.10, 96.15

[56] References Cited

U.S. PATENT DOCUMENTS

| 4,740,048 | 4/1988 | Mori | 350/96.10 X |
| 4,936,663 | 6/1990 | Mori | 350/96.15 |
| 4,936,668 | 6/1990 | Mori | 350/96.15 |

Primary Examiner—William L. Sikes
Assistant Examiner—Phan T. Heartney
Attorney, Agent, or Firm—Jordan and Hamburg

[57] ABSTRACT

A light radiator includes a semitransparent tubular container, a large number of transparent plates arranged in series inside of said tubular container in such a way as to be inclined in the same direction as the axis of said container, a light-guiding, cable-connecting portion provided at one end of the container to connect thereto the output end of a light-guiding cable, a lens inserted between the light-guiding, cable-connecting portion and the transparent plate and a motor for rotating the tubular container. The transparent plates each have at least a partial reflecting surface and their reflecting surfaces are made larger in size because of being farther from the lens in order to reflect a substantial, even amount of light rays. A light radiator capable of radiating solar rays which are focused by lenses introduced into a light-guiding cable and of being transmitted therethrough to the light radiator for radiating them to such objects as plants etc.

10 Claims, 3 Drawing Sheets

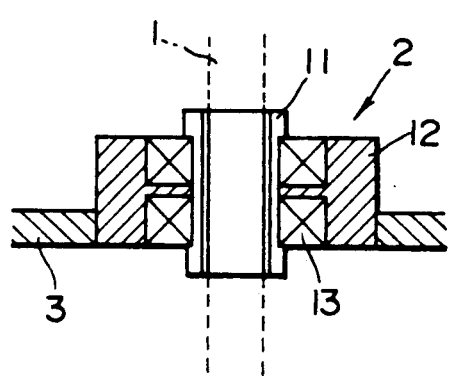
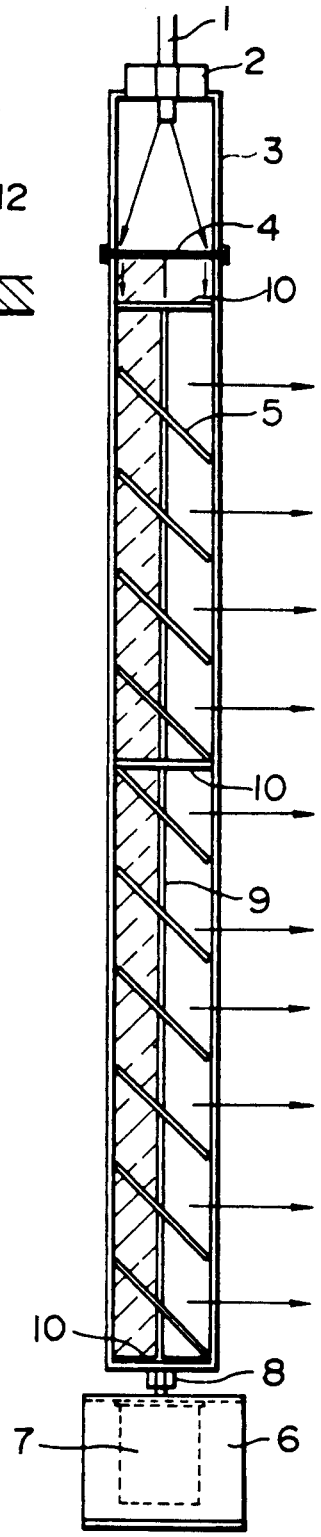
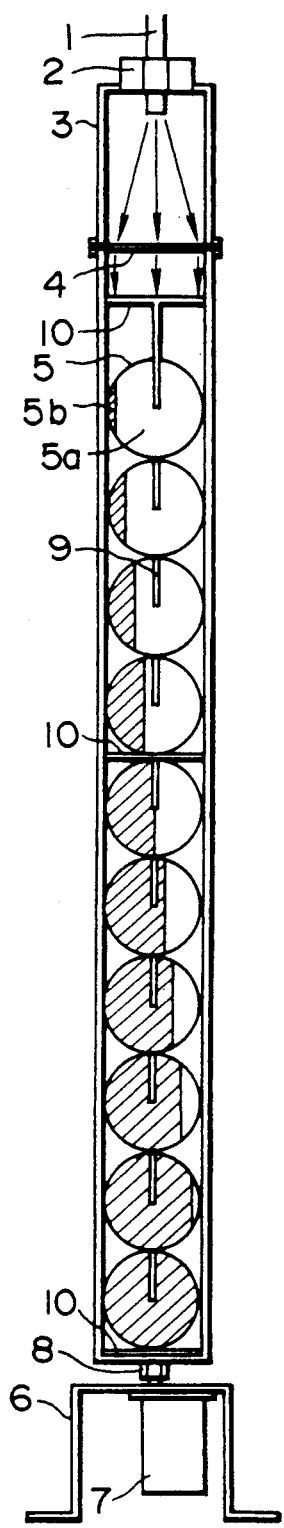

LIGHT RADIATOR

BACKGROUND OF THE INVENTION

The present invention relates to a light radiator which is capable of introducing solar rays focused by lenses or the like into a light-guiding cable, transmitting them therethrough to a remote place and radiating the same from the cable to objects such as plants.

In recent years there has been an increased interest in solar energy and its effective utilization.

The uses of solar energy have been actively studied and developed in various fields. It is known that the most effective utilization of solar energy is realized when it is used as light energy without being converted into thermal or electrical energy i.e. with no loss of energy through conversion. Collecting solar rays outdoors and transmitting them through a light-guiding cable to wherever the light is needed has been proposed. For example, for illumination or for cultivating plants in a room, for cultivating fish and plants in the sea or as a source of light for the propagation of chlorella or for promoting the health of human beings. In any case, when the light rays emitted from the end of a light-guiding cable are used for illumination or like purposes, it is desirable to spread them out at a wide angle to the axis of the light-guiding cable. However, it is difficult to obtain widely dispersed light radiation with an even or desirable distribution.

SUMMARY OF THE INVENTION

It is an object of the present invention to provide a light radiator which can effectively and evenly radiate solar rays collected through a lens system and to transmit them through a light-guiding cable.

In order to realize the above-mentioned purpose, the present applicant proposes a light radiator which comprises a semi-transparent tubular container, a large number of transparent plates arranged in series inside of said tubular container in such a way as to be inclined in the same direction as the axis of said container, a connecting portion provided at one end of the container to connect thereto a light-emitting end of a light-guiding cable, a lens inserted between the connecting portion and the transparent plate, and a motor for rotating the tubular container, characterized in that the transparent plates have at least partial reflecting surfaces respectively and that their reflecting surfaces are of a larger size because of being farther from the lens so as to reflect a substantial, even amount of light rays, and also the light-guiding cable connecting portion is constructed so as to rotatably hold the light-guiding cable therein and to rotatably support the tubular container thereon, and also a nearly semi-circular end-portion of the tubular container from which light shall not be discharged, is constructed as a reflecting surface, and further, a light radiator which comprises a semi-transparent tubular container, a large number of transparent plates concentrically secured in series onto a transparent center shaft of the tubular container, said transparent plates being inclined in the same direction as the axis of said tubular container, a light-guiding, cable-connecting portion provided at one end of the container to connect thereto the light-emitting end of the light-guiding cable, a lens inserted between the connecting portion and the transparent plate, and a motor for rotating the center shaft of the tubular container, characterized in that the transparent plates have at least a partial reflecting surface respectively and said reflecting surfaces are of a larger size because of being farther from the lens so as to reflect a substantial, even amount of light rays. A preferred embodiment of the present invention is described hereinafter with reference to the drawings.

BRIEF DESCRIPTION OF THE DRAWINGS

FIG. 1 is a front view illustrating a light radiator embodying the present invention;

FIG. 2 is a side view of said light radiator;

FIG. 3 is a sectional view showing a light-guiding portion of the light radiator;

DESCRIPTION OF THE PREFERRED EMBODIMENTS

Figure 4:
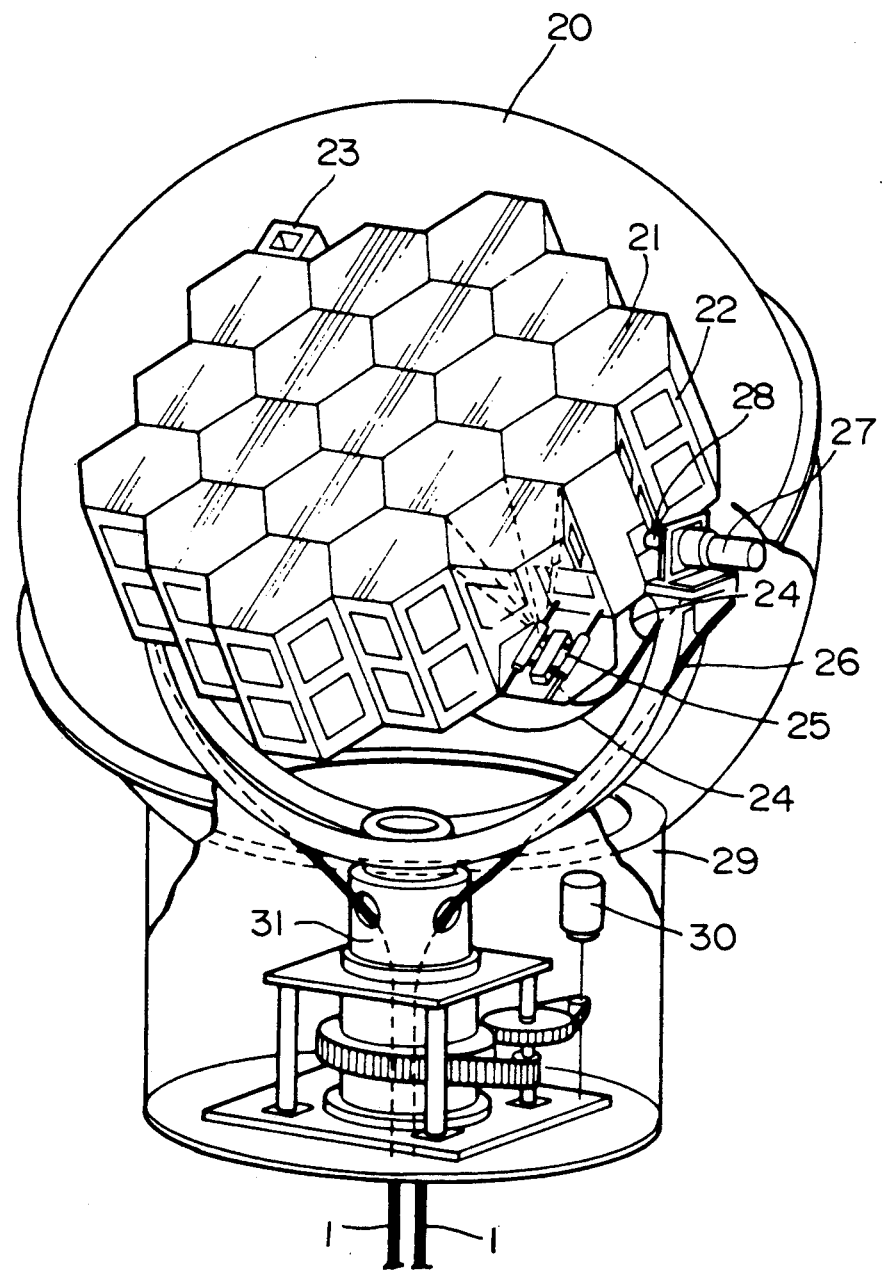
FIG. 4 is a view for explaining an embodiment of a solar ray collecting device previously proposed by the present applicant.

FIG. 1 is a front view for explaining a light radiator described in claims 1 to 3. FIG. 2 is a side view of the light radiator, and FIG. 3 is a sectional view of the light-receiving portion of the light radiator. The light radiator, according to the present invention, is composed of a light-guiding cable 1, a light-receiving portion 2, a transparent tubular container 3, a convex lens 4, a transparent plate 5 having a transparent part 5a and a reflecting part 5b, a supporting base 6, a motor 7, a rotary shaft 8, a transparent center shaft 9, a transparent supporting plate 10, a holder 11 of the light-guiding cable, a holder 12 of the tubular container and a bearing 13. The solar rays focused through a lens system, not shown, are transmitted through the light-guiding cable 1 and pass through a convex lens 4 having a focal point at the light-emitting end of the light-guiding cable 1 and are converted thereby into substantially parallel light rays which are then introduced into the tubular container 3. In the tubular container 3, a larger number of transparent plates 5 are slantingly mounted at a specified distance from each other as shown in FIG. 2. In this embodiment, the tubular container is made in a cylindrical form and contains therein oval transparent plates 5 and round supporting plates 10. In this case, all transparent plates 5 and supporting plates 10 have been previously attached to the transparent center shaft 9 by the use of an adhesive or the like in order to form an integrated element to be inserted into the cylindrical container 3. The supporting plates 10 serve as reinforcements for said element. Each transparent plate 5 has a transparent part 5a and a reflecting part 5b which may be formed by evaporating a metal film or by bonding a metal plate to a given part of the transparent plate 10. It is also possible to combine a separate reflecting plate and a separate transparent plate to form one plate 10. As shown in FIG. 1, the plates 10, positioned farther from the light-introducing portion 2, have step-wise, larger reflecting surfaces. The plates, having a partial reflecting surface of a chordal form are shown, their reflecting parts possibly concentrically circular, segmental or of another suitable form. The tubular container is not always made in a circular form but may have a section shaped in any other form as for example a square. The transparent plates should comply in form to the tubular container. The light rays emitted from the light-emitting end of the light-guiding cable 1 and converted into substantially parallel light rays, are partially reflected by the reflecting surfaces 5b of the plates 5 and finally all discharged outwardly through the side wall of the tubular container 3.

Since the reflecting surfaces 5b of the transparent plates 5 are evenly spaced from and overlap with each other in the direction of the light rays, the light rays not reflected by the preceding reflecting surface, are reflected by the next reflecting surface and thereby all the light rays can be discharged outwardly through the side wall of the tubular container. Consequently, it may be possible to obtain evenly distributed light radiation through the side wall of the tubular container by suitably designing the size of the reflecting surfaces of the transparent plates.

Plants use solar energy to synthesize their own food from carbon dioxide and water and distribute it to their trunks, fruit etc.. The transportation of food in plants can be effectively performed under the conditions where no light is given and/or oxygen is present and/or temperatures are lower. In other words, in order to effectively cultivate plants, both the photosynthesis and the transportation of the food in them are promoted. For this purpose it is effective to periodically supply light rays at a given time interval i.e. to alternately repeat a light radiation period (for photosynthesis) and a period of darkness with no light radiation (for the purpose of transporting the food). Furthermore, in case of plant cultivation, intermittent light radiation to the plants (at an interval of several microseconds to several milliseconds) is preferable to continuous light radiation. Namely photosynthesis is encouraged by a light reaction coupled with a dark reaction, and a plant's growth can be promoted by supplying it with intensive light radiation for the light reaction period and with no radiation or weak light radiation for the dark reaction period. Moving the light radiator is also effective for distributing the light rays widely over the plants with increased efficiency and for the full utilization of the light energy in comparison with the case of radiating the plants from a fixed light radiator. In other words, in the case of using light radiators of the same capacity, the traveling one can grow plants within a wider cultivating area and, furthermore, it can effectively promote the plant's growth by virtue of the repetition of light and dark periods since the plants are periodically radiated and shaped by each other while the radiator travels over them.

FIG. 3 is a view showing, by way of example, a light-introducing portion of the light radiator. In FIG. 3, a light-guiding, cable-holding portion 11 holds therein the output end of the light-guiding cable and is secured to a suitable element. Said portion is also provided at its periphery with a bearing 13 so as to rotatably support the upper part of the tubular container 12. The lower part of the tubular container 3 is supported by a rotary shaft 8 to be driven by a motor 7 with a revolving mechanism. Consequently, when the light radiator is installed in the center of a vegetable garden, it can be rotated all around (360°) by the motor 7 to supply the light rays to all the plants. When the light radiator is installed in a corner of a vegetable garden, it may be rotated within a given range by the motor 7 to supply light rays only to the area where plants are being cultivated. In the case shown, each tubular container (light radiator) is provided with a driving motor. However, it is also possible to rotate a plurality of tubular containers at the same time by using a single motor. Although the radiator is vertically installed in the case shown, it may also be installed horizontally on the ceiling or on the ground. In such cases the rotation angle of the motor may be limited so as to radiate the light from the radiator downward only or upward only to the plants.

When a semi-circular portion (shown in FIG. 2), from which the light rays are not radiated, of the tubular container 3, is made as a reflecting surface, an almost even amount of light rays, introduced into the tubular container, can be radiated in the arrow's direction and thereby the light energy may be more efficiently utilized.

While in the above-described embodiment the transparent plates are secured to the tubular container which can be rotated, it is also possible to design the light radiator wherein, as described in claim 4, a tubular container is firmly secured together with a light-guiding, cable-holding portion and where transparent plates are mounted on the center shaft which can be rotated inside the tubular container.

As is apparent from the foregoing description, according to the present invention, it may be possible to provide a low cost and simply designed light radiator which is capable of receiving the light energy transmitted through a light-guiding cable and capable also of evenly and effectively radiating the same to the plants.

FIG. 4 is a construction view illustrating, by way of example, a solar ray collecting device previously proposed by the present applicant. In FIG. 4, numeral 20 is a transparent protective capsule, 21 is a Fresnel lens, 22 is a lens holder, 23 is a solar position sensor, 24 is a number of optical fibers or a fiber optic cable consisting of a number of optical fibers located on the focal plane of the Fresnel lens, 25 is an optical fiber or fiber optic cable holder, 26 is an arm, 27 is a pulse motor, 28 is a horizontal shaft to be rotated by said pulse motor 27, 29 is a base for mounting the protective capsule 20 thereon, 30 is a pulse motor, 31 is a vertical shaft to be rotated by said pulse motor 30, 1 is a bundle of fiber optic cables 24.

The direction of the sun is detected by means of the solar position sensor 23 and its detection signal which controls the pulse motors 27 and 30 for rotating the horizontal shaft 28 and 31 respectively so as to always direct said solar position sensor 23 toward the sun, and the sunlight focused by each lens 21 is guided into the corresponding light guide 24 through its end surface set at the focal point of said lens. The light guides 24, with their end faces placed at the corresponding lens focal planes, are bundled together in a fiber optic cable 1, which is led out from the solar ray collecting device and laid wherever the light is needed for illumination, cultivation of plants, nurturing of animals, for human sunbathing etc.

Figure 5:
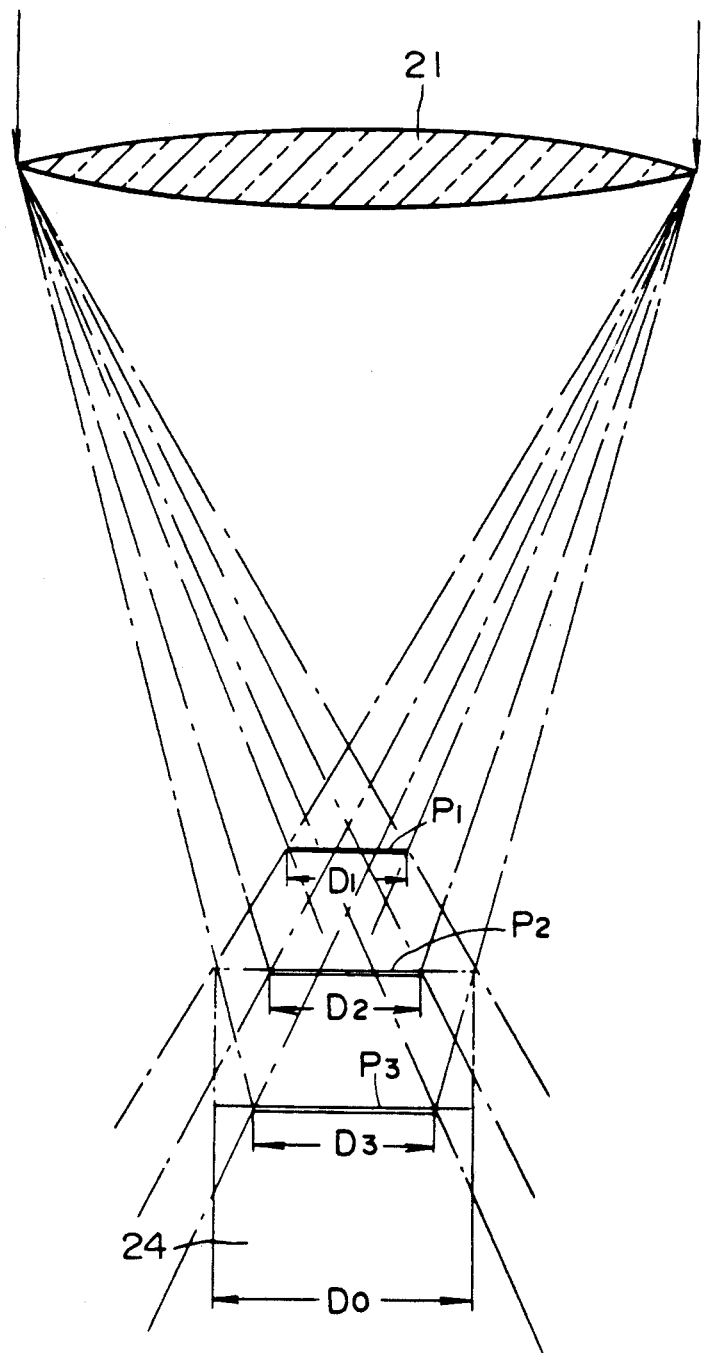
FIG. 5 is view for explaining a principal of guiding the sunlight into a fiber optic cable.

FIG. 5 is a view for explaining how to guide the light rays collected by the lens 21 into the light guide.

In FIG. 5, 21 is a Fresnel lens or the like and 24 is a light for guide for receiving the sunlight focused by said lens and transmitting the same there-through to any desired place. In the case of focusing the sunlight through the lens system, the solar image has a central portion consisting of almost white light and a circumferential portion containing therein a large amount of the light components having wave-lengths corresponding to the focal point of the lens system. Namely, in the case of focusing sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3.

Consequently, as shown in FIG. 5, when the light-receiving end-surface of the light guide is set at position P1, it is possible to collect sunlight containing plenty of the blue color components at the circumferential portion thereof. When the light-receiving end-surface of the light guide is set at position P2, it is possible to collect sunlight containing plenty of the green color components at the circumferential portion thereof. When the light-receiving end-surface of the light guide is set at position P3 it is possible to collect sunlight containing plenty of the red color components at the circumferential portion thereof. In each case, the diameter of the light guided can be selected in accordance with the light components to be collected. For instance, the required diameters of the light guides are D1, D2 and D3, respectively, depending on the colors of the light rays desired i.e. blue, green or red. In such a way, the required amount of the fiber optic cable can be saved and thereby the sunlight containing therein plenty of the desired color components can be collected most effectively.

Furthermore, as shown in FIG. 5, if the diameter of the light-receiving, end-surface of the fiber optic cable is enlarged to D0, it may be possible to collect light containing therein all of the visible wavelength components but not containing therein any ultraviolet or infrared rays.

It is also possible that the light-receiving surfaces of the light guides 24 can be fixed at the focal plane of the lens system beforehand by a manufacturer or said light-receiving surfaces of the light guides can be made adjustable in the direction of the light's axis and regulated by the user so as to obtain the desired colored light components.

As mentioned above, when the sunlight is focused through a lens system, the solar image has a central portion of white color light and a circumferential portion, the content of which varies depending upon the distance from the lens system. Namely, at a short distance from the lens system, the blue colored light is gathered and at a large distance from the lens system the red colored light is gathered. By adjusting the set position of the light-receiving faces of the light guides it is possible to eliminate the infrared and ultraviolet rays and thus obtain sunlight that is suitable for sunbathing and for cultivating animals and plants.

I claim:

1. A light radiator comprising a tubular container which is at least partially transparent and which has an elongate axis, a plurality of spaced transparent plates located in said tubular container with each plate being at an acute angle relative to said axis, said tubular container having a longitudinal end portion, a light-guide cable means mounted on said end portion to provide for rotation of said end portion relative to said light-guide cable means, a lens in said tubular container disposed between said light-guide cable means and one of said plates, and motor means for rotatably driving said tubular container about said axis, each of said transparent plates having at least a partial reflective surface with the size of said partial reflective surface of each plate increasing with increasing distance from said end portion such that each plate thereby reflects substantially the same amount of light rays.

2. A light radiator according to claim 1, wherein said longitudinal end portion comprises rotatable means for rotatably holding said light-guide cable.

3. A light radiator according to claim 1, wherein said plates have an oval configuration.

4. A light radiator according to claim 1, wherein said tubular container has a semi-circular portion formed as a reflecting surface.

5. A light radiator according to claim 1 further comprising a shaft on which said plates are mounted, said shaft being made of a transparent material.

6. A light radiator according to claim 5 further comprising circular supporting plate members in said container and mounted on said shaft, said circular supporting plate members being transparent.

7. A light radiator according to claim 1, wherein each of said transparent plates has a reflecting part and a transparent part.

8. A light radiator according to claim 7, wherein the delineation of said reflecting part and transparent part lies along a charodal line.

9. A light radiator according to claim 8, wherein said shaft is made of a transparent material.

10. A light radiator comprising a tubular container which is at least partially transparent and which has an elongate axis, rotary means rotatably mounted in said container for rotation about said axis, said rotary means comprising a rotary shaft having a shaft axis coaxial with said container axis and a plurality of spaced transparent plates mounted on said shaft with each plate being at an acute angle relative to said axis of said shaft, said tubular container having a longitudinal end portion, a light-guide cable means mounted on said end portion, a lens in said tubular container disposed between said light-guide cable means and one of said plates, and motor means for rotatably driving said shaft about said container axis, each of said transparent plates having a least a partial reflective surface with the size of said partial reflective surface of each plate increasing with increasing distance from said end portion of said container such that each plate thereby reflects substantially the same amount of light rays.

* * * * *